United States Patent [19]

Barnes et al.

[11] Patent Number: 5,358,088
[45] Date of Patent: Oct. 25, 1994

[54] HORIZONTAL MAGNETORESISTIVE HEAD APPARATUS AND METHOD FOR DETECTING MAGNETIC DATA

[75] Inventors: Elwood E. Barnes, Cochranville; Mark H. Kryder, Bradford Woods; Keith R. Mountfield, Pittsburgh, all of Pa.

[73] Assignee: Mars Incorporated, McLean, Va.

[21] Appl. No.: 981,800

[22] Filed: Nov. 25, 1992

[51] Int. Cl.$^5$ .................................... G07D 7/00
[52] U.S. Cl. .................................... 194/206; 360/113
[58] Field of Search ............... 194/206, 207; 360/113; 235/449, 450

[56] References Cited

U.S. PATENT DOCUMENTS

| | | | |
|---|---|---|---|
| 4,473,799 | 9/1984 | Favre | 324/226 |
| 4,487,306 | 12/1984 | Nao et al. | 382/7 X |
| 4,523,330 | 6/1985 | Cain | 382/7 |
| 4,588,292 | 5/1986 | Collins | 209/534 X |
| 4,628,194 | 12/1986 | Dobbins et al. | 209/534 X |
| 4,703,378 | 10/1987 | Imakoshi et al. | |
| 4,749,087 | 6/1988 | Buttifant | 209/534 |
| 4,916,295 | 4/1990 | Chominski | 235/449 |
| 4,988,850 | 1/1991 | Masuda et al. | 235/449 |
| 5,014,325 | 5/1991 | Moritomo | 382/7 |
| 5,155,643 | 10/1992 | Jones et al. | 360/113 |
| 5,159,513 | 10/1992 | Dieny et al. | 360/113 |
| 5,166,849 | 11/1992 | Fedeli | |
| 5,180,903 | 1/1993 | Shigeno et al. | 235/449 |
| 5,216,561 | 6/1993 | Jagielinski | 360/113 |

FOREIGN PATENT DOCUMENTS

| | | |
|---|---|---|
| 097570 | 1/1984 | European Pat. Off. |
| 2909731 | 9/1979 | Fed. Rep. of Germany |
| 3921420 | 1/1990 | Fed. Rep. of Germany |
| 1481902 | 8/1977 | United Kingdom |
| 2257290 | 1/1993 | United Kingdom |

OTHER PUBLICATIONS

Schwarz, "Signal Sampling of Pulse-Biased MR Head", IBM Technical Bulletin, vol. 19, No. 8, Jan., 1977.

Cheatham et al., "Magnetoresistive Head Element", IBM Technical Bulletin, vol. 19, No. 7, Dec., 1976.

*Primary Examiner*—F. J. Bartuska
*Attorney, Agent, or Firm*—Davis Hoxie Faithfull & Hapgood

[57] ABSTRACT

An apparatus and method for detecting magnetic data on media is disclosed which utilizes an array or arrays of horizontal magnetoresistive sensors. The present invention detects the pitch or separation of magnetic transition data on the magnetic medium under test, and generates a signal that is independent of the velocity of the medium. In one embodiment, the magnetoresistive sensors employed in an array are spaced apart a distance which corresponds to the separation of magnetic transition data of interest, and the output of each sensor is connected to a voltage adder. The signal from the voltage adder is at a maximum when the separation of the magnetic transition data corresponds to the sensor separation. A comparator is connected to the output of the voltage adder, and compares the voltage adder output to a predetermined threshold voltage before indicating that a medium having a particular magnetic transition data pattern is detected. Alternate embodiments contemplate connecting linear circuitry, digital circuitry, fuzzy logic or other electronic circuitry to the array of magnetoresistive sensors. An apparatus according to the present invention is accurate, requires a minimum of parts, is simple and inexpensive to manufacture, and may be employed in a currency validator, magnetic card reader or the like.

41 Claims, 9 Drawing Sheets

HORIZONTAL MAGNETORESISTIVE HEAD APPARATUS AND METHOD FOR DETECTING MAGNETIC DATA

FIELD OF THE INVENTION

The present invention relates to an apparatus having an array of horizontal magnetoresistive heads which may be utilized for magnetic pattern sensing and reading. Such an array of sensors detects the pitch or separation of a series of spaced magnetic lines on a medium. An array could also be arranged to detect a magnetic pattern consisting of non-periodic spacing. More particularly, the array of the present invention may be utilized in a currency validator to sense magnetic data from U.S. banknotes to determine their denomination. In addition, the present invention may be employed in many other applications involving magnetic sensing or reading, such as credit card magnetic strip reading or the like.

BACKGROUND OF THE INVENTION

A magnetoresistive head is a sensing or reading head which utilizes magnetoresistive elements to sense or read magnetic information inherent in a magnetic medium. A magnetoresistive element is one whose electrical resistance varies with varying incident magnetic fields.

Prior art magnetic heads have been used for a great many applications including coin sensing, currency and bill validation, and sensing other forms of scrip. Typically, inductive type magnetic heads have been used, which require a rapidly changing magnetic field in order for magnetic information to be detected. Conversely, magnetoresistive heads are capable of detecting and reading information inherent in a slowly moving or stationary magnetic field.

A standard technique for determining the spatial relationship of signals from a magnetic medium involves using a single magnetic sensor to sense the signals while recording the time between each magnetic event as the medium moves at some velocity in relation to the sensor. In such a single magnetic sensor system, sometimes noise events cause data reduction problems. In addition, difficulties arise regarding determining the time between each magnetic event because the separation between the magnetic events on the medium is calculated by multiplying the recorded times by the detected velocity. A problem in implementing this technique is finding an accurate and inexpensive means to determine the velocity of the medium with respect to the sensor. One option is to control the speed of movement of the medium to ensure consistent and even movement of the medium under the sensor. Although speed control does ameliorate some of the problems associated with velocity changes, it adds cost, size and complexity to the system. Further, speed control is not sufficient under certain conditions, for example, when the medium is controlled by a human such as when a bill is inserted into a validator or a credit card is swiped through a reader.

The velocity measurement typically consisted of either measuring the amount of time it took the medium to move over a fixed distance, or measuring the distance the medium traveled in a fixed period of time. Often the velocity measurement became available only after a region of interest passed under the sensor, and typically reflected a mere average of the velocities attained over the entire distance traveled. Alternatively, the velocity determination was made by sampling the movement of the medium at frequent intervals, utilizing a costly encoder apparatus or other means.

Another prior art technique for reading magnetic information required two tracks on the medium. The first track contained the magnetic information to be read, and the second track contained regularly occurring clocking data. This technique exhibited poor flexibility in accommodating variations in the spacing of the magnetic information on the medium. Poor resolution resulted when large step increments were chosen for a desired spatial measurement. Further, when small step increments were used, costly and complex means were employed to accommodate the resulting delicate nature of the reading apparatus. Yet further, this technique cannot be used in some applications such as currency validation because the structure of the test medium is fixed without a clocking track.

Applications where the accurate determination of magnetic spatial separation is important include banknote denomination and credit card magnetic strip reading. For example, the separation of the grid lines of magnetic ink on the portrait-side of a U.S. banknote varies slightly depending on denomination. The one-dollar, two-dollar and five-dollar banknotes have grid line separations of 200, 250 and 275 microns, respectively. In addition, other denomination banknotes contain these grid line separations alone and in combination, and contain other spacings. Prior art systems that detected the magnetic grid line separation of U.S. banknotes required costly apparatus of significant complexity. Furthermore, the prior art utilized complex techniques to extract magnetic data from credit card magnetic strips, because the velocity of a credit card can vary significantly over the length of the card when moved through a reader, especially if moved by hand.

SUMMARY OF THE INVENTION

An object of the present invention is to accurately determine the spatial separation and relationships of magnetic events on media without having to determine the velocity of the media, and without having to determine velocity correction factors.

Another object of the present invention is to make information regarding the spatial separation and relationships of magnetic events available at the occurrence of the trailing member of the magnetic events.

Yet another object of the present invention is to use hardware to detect a particular magnetic pattern without the need for costly software corrections.

A further object of the present invention is to provide a means to detect magnetic patterns which results in a signal having an improved signal to noise ratio, and that permits the use of signal multiplication factors two or more times the size of each individual signal.

The present invention comprises an array of horizontal magnetoresistive heads or sensors which are spaced apart at predetermined distances so that two or more sensors can detect a particular spacing of lines of magnetic data on a medium. Several arrays of sensors could be used in the same detection apparatus to recognize and distinguish between media having different magnetic line spacings. A large sensor output signal is generated from a particular pair of sensors having a spacing that substantially matches the magnetic line separation of magnetic data on the medium being tested.

In a preferred embodiment of the present invention, the number of sensors required to accurately sense magnetic data is minimized by using a common reference sensor, and aligning the other sensors to be separated by specific distances from the reference sensor.

A signal generated by an array according to the present invention is independent of the velocity of the medium being tested. Further, information concerning line spacing is determined at the time the medium passes under the sensing array. Thus, the present invention dispenses with the troublesome means for measuring velocity required by some prior art techniques.

According to the present invention, each sensor of an array consists of two precisely spaced horizontal magnetoresistive elements, placed horizontally with respect to the plane of the medium being tested, and associated circuitry. The output signal of each magnetoresistive sensor is the difference between the signals from the two elements.

The present invention may find applications in banknote validators, credit card magnetic strip readers, or in other apparatus used to read magnetic data. In addition, the present invention requires a minimum of parts, and is simple and inexpensive to manufacture.

More objects and advantages of the present invention will become apparent to those skilled in the pertinent art upon reading the detailed description which follows below.

DETAILED DESCRIPTION

Figure 1:
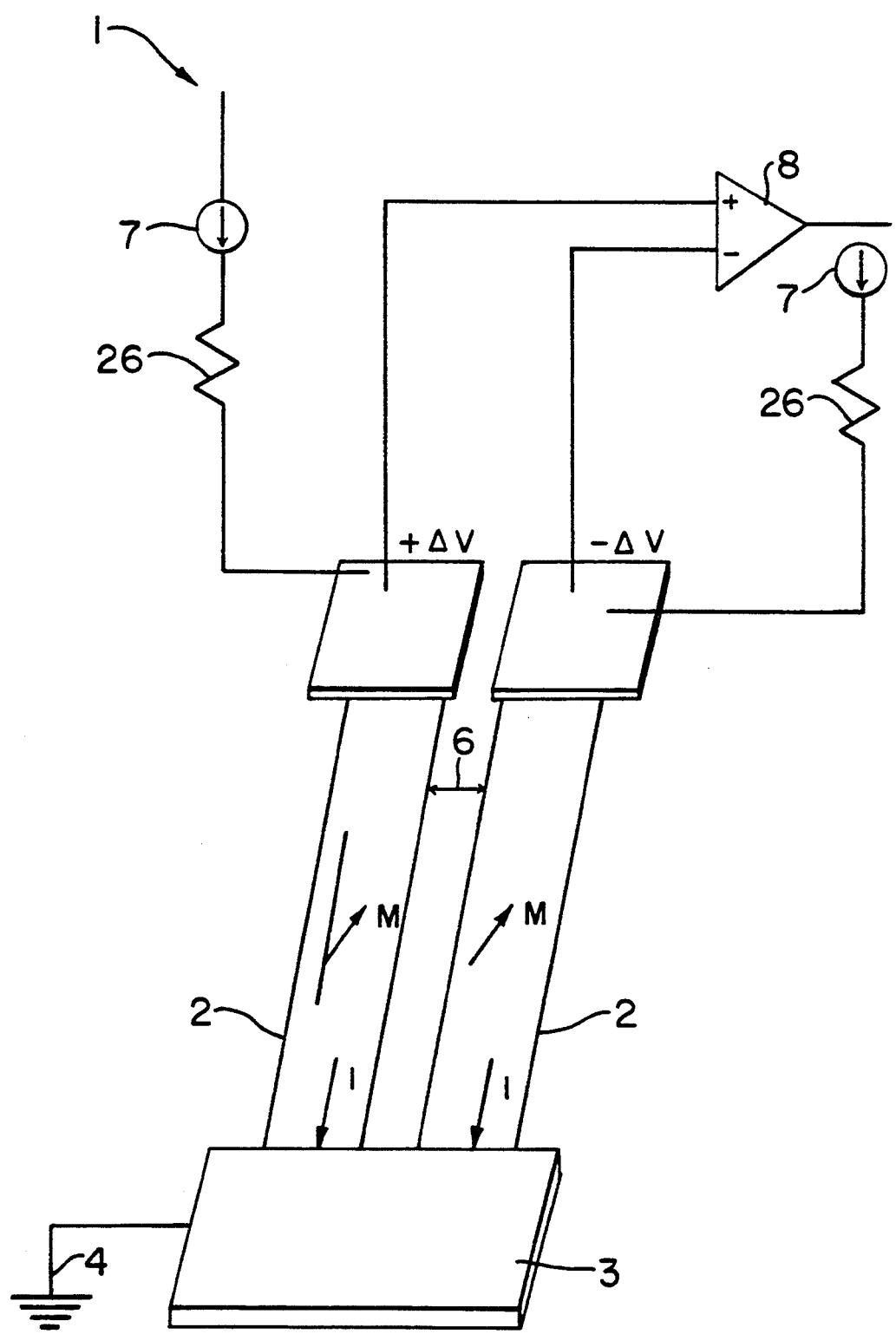
FIG. 1 is a schematic diagram of a prior art unshielded horizontal magnetoresistive head or sensor.

FIG. 1 is a simplified schematic diagram of the structure of a prior art unshielded horizontal magnetoresistive head, or sensor 1 which may be used in the present invention. (The figures are intended to be representational and are not necessarily drawn to scale.) Other prior art heads may be used, such as the shielded magnetoresistive head disclosed in D. W. Chapman, D. E. Heim and M. L. Williams, "A New Horizontal MR Head Structure" IEEE Trans Magn , 25, 3689 (1989). Although a brief description of the unshielded horizontal magnetoresistive head is provided below, a more detailed description can be found in U.S. Pat. No. 5,155,643 which is assigned to the assignee of the present application and which is incorporated by reference in its entirety herein.

The unshielded horizontal magnetoresistive head 1 of FIG. 1 contains two magnetoresistive strips 2 which lie parallel to one another in the same horizontal plane, separated by a gap 6. The gap 6 may be filled with air or any other type of dielectric material, which is defined as an electrical insulator capable of sustaining an electrical or magnetic field with a minimum dissipation in power. The magnetoresistive strips 2 are connected at one end by a cross member element 3. Cross member element 3 is an electrical conductor which structurally connects the magnetoresistive strips 2 together, and which electrically connects them to a common electrical point 4, which typically is system ground. The ungrounded ends of each of the magnetoresistive strips 2 are connected through equal valued resistors 26 to a pair of constant current supplies 7, and are also connected to the inputs of a differential voltage sensing device 8. Identical currents (I) flow from the constant current supplies 7 through the resistors 26, and then through each of the magnetoresistive strips 2 to system ground 4.

Magnetoresistive elements, by their nature, experience a change in electrical resistivity or resistance as a function of the orientation of the magnetic dipole moments M that occur in the material when a magnetic field is applied. As a result, in the absence of a magnetic field, the voltage drop across each of the magnetoresistive strips is substantially the same, and thus the output of the differential voltage amplifier 8 is essentially 0 volts. When a magnetic field is applied proximate to the strips so that they are not affected equally, the resistance of the two strips will vary, and since the currents passing through the strips 2 are held constant by the constant current supplies 7, the voltage drops across the strips will vary.

The unshielded horizontal magnetoresistive head 1 is most responsive to magnetic transitions, like those inherent on moving U.S. banknotes, not constant magnetic levels. The transitions for the magnetic ink patterns on U.S. banknotes occur at the edges of the ink lines. The unshielded horizontal magnetoresistive head 1 produces a maximum voltage signal at the output of the differential voltage amplifier 8 when the magnetic transition, or the edge of a magnetic ink line on the U.S. banknote, is in the center of the gap 6 between the magnetoresistive elements 2. The signal output of the differential voltage amplifier 8 will significantly decline as the transition is moved away from the gap center. The output signal approaches zero when the magnetic transition of the medium under test is located slightly beyond the middle of either of the magnetoresistive elements 2.

Figure 2A:
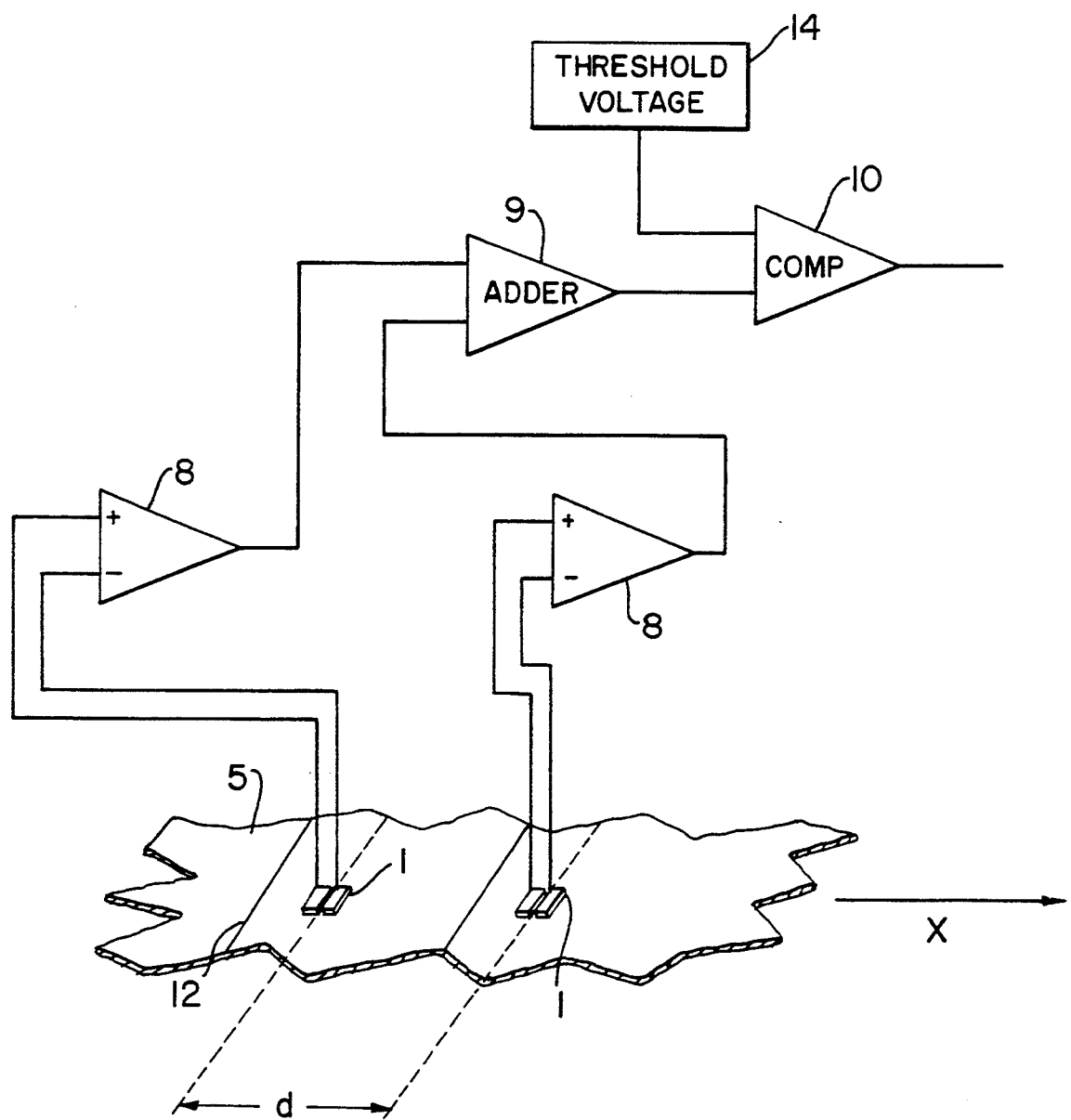
FIG. 2A is a simplified diagram of the connection of two horizontal magnetoresistive sensors in an array configuration.

FIG. 2A is a simplified diagram of two magnetoresistive sensors 1, like that of FIG. 1 although other types of magnetoresistive sensors could be used, separated by a distance "d" and connected to common circuitry in a two-sensor array configuration. Although the differential voltage amplifiers 8 are depicted, the resistors and constant current supplies necessary for operation of each of the sensors are not shown. The outputs of the differential voltage amplifiers 8 of each sensor are connected to a voltage summer or adder 9. During operation, a magnetic media 5 having magnetic ink lines 12 is transported past the sensors 1 in the direction of arrow X. At some point during the passage of the article beneath the sensor array, magnetic transitions of the article will be located in the center of at least one of the magnetoresistive head gaps 6 (shown in FIG. 1) between the magnetoresistive elements 2 of a sensor 1, and thereby produce a signal at the voltage adder 9 output. The output voltage signal of the voltage adder 9 will be equal to the magnitude of the sum of the input voltages generated by each sensor in the array. The voltage adder 9 will produce a maximum signal if magnetic ink lines 12 occur in the centers of each magnetoresistive sensor 1 simultaneously. This signal would then be used by a microprocessor (not shown) or other control circuitry to determine whether or not the media 5 was of a particular type.

Figure 3A:
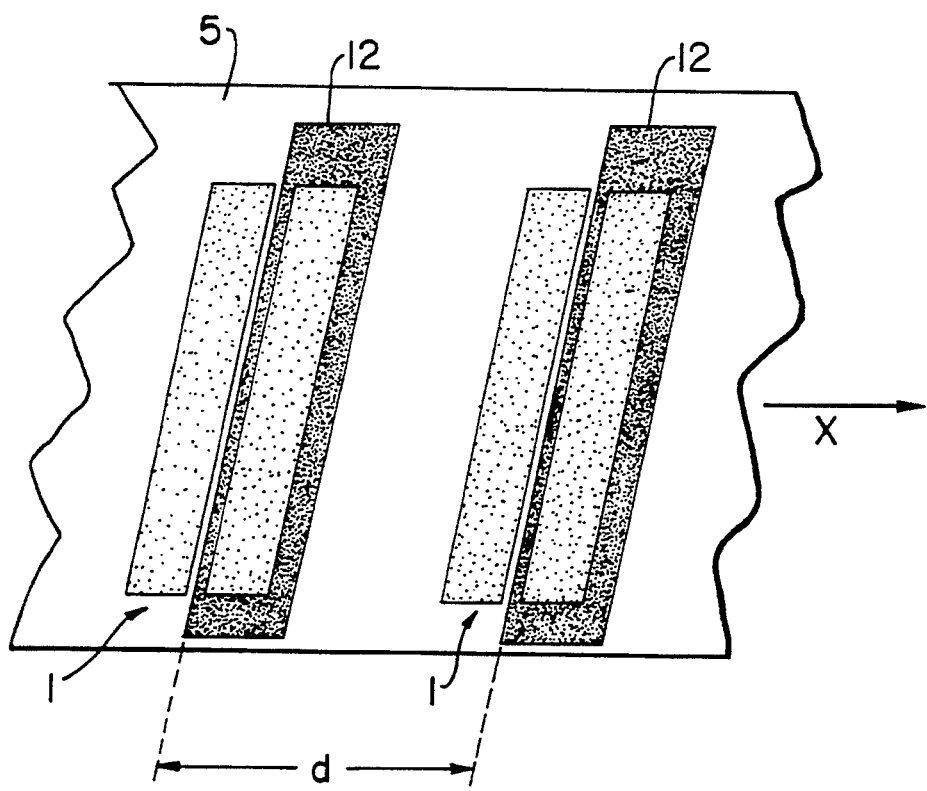
FIG. 3A is a simplified illustration of the array of FIG. 2 aligned with the magnetic ink stripes of a medium.

FIG. 3A is a simplified illustration of the array of FIG. 2A wherein the distance "d" between the gaps 6 of each sensor matches the separation of the magnetic ink lines 12 of a test article 5. When this occurs, the output of the voltage adder 9 (shown in FIG. 2A) will be at a maximum, and will be compared to a predetermined threshold voltage 14 by comparator 10. The predetermined threshold voltage 14 should be set at a level that can only be exceeded by the maximum voltage output of the voltage adder 9. If the output voltage of the voltage adder 9 is greater than the threshold voltage 14, then the comparator 10 generates an output signal which identifies the medium 5 as having magnetic transition spacings of a particular type.

Figure 3B:
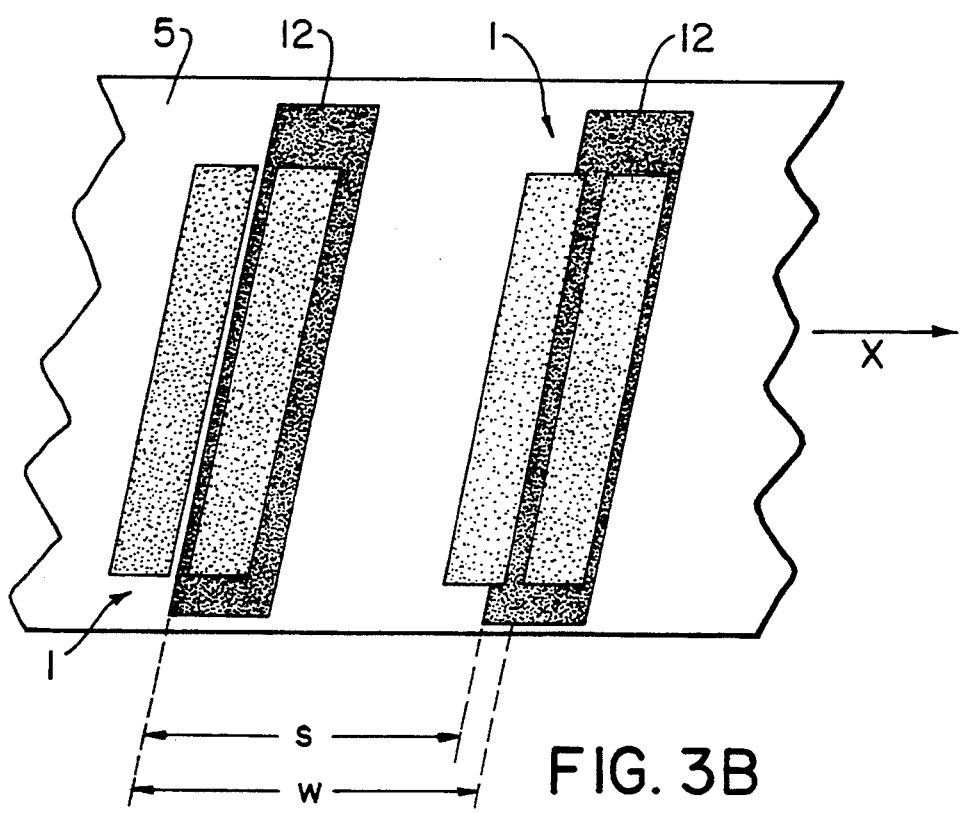
FIG. 3B is a simplified illustration of the array of FIG. 2 misaligned with the magnetic ink stripes of a medium.

Conversely, FIG. 3B depicts the situation where the separation "w" of the array heads 1 does not equal the separation "S" between the magnetic ink lines 12 on the medium 5. Thus, these magnetic transitions will never be simultaneously positioned beneath the center of each sensor 1. In the spacing mismatch situation depicted in FIG. 3B, the output of the voltage adder 9 will always be substantially diminished in comparison to the maximum signal generated for the arrangement depicted in FIG. 3(a). Thus, the output of the voltage adder 9 will be less than the threshold voltage 14 so that the comparator 10 will not generate an output signal, and thus the medium 5 will not be identified as being of that particular type.

Referring to FIG. 2A, the differential voltage amplifiers 8 connected to each of the sensors 1 are operated with respective gains so that the maximum signal generated by each sensor is normalized to unity. Thus, each sensor in an array has a substantially equal maximum output signal. This insures the accuracy of the array, and facilitates setting a threshold voltage 14 for a peak detector or comparator 10 which is also connected to the output of voltage adder 9. The threshold input of the comparator 10 should be set to a sufficiently high magnitude or level to indicate a peak condition only when magnetic transitions are located in the gap centers of each of the associated sensor heads. The threshold voltage may be fixed, set or adjusted at the time of manufacture or some later time. In general, adequate performance can be achieved by setting the threshold voltage to (S-K) times the normalized maximum voltage of the differential amplifiers, where S equals the number of sensors used to detect a particular spacing and K is a constant which is dependant upon S. K should be equal to 0.5 for S=2 and will increase as S increases. For example, a threshold voltage of 1.5 V is sufficient for the array depicted in FIG. 2, where the maximum output of each of the amplifiers 8 is set to 1.0 V to cause a maximum adder 9 output of 2.0 V. Other values for the threshold voltage could readily be used to either restrict or broaden the tolerance of the sensing apparatus. For example, the threshold voltage may be derived from one or more signals in the apparatus.

In an alternative arrangement, the outputs of the differential voltage amplifier 8 of FIG. 2 are connected to a logical AND gate instead of to the adder 9. Thus, when both voltage amplifiers 8 produce input signals for the AND gate simultaneously, the AND gate would generate an output signal to identify the medium 5 as being of a particular type. In such a circuit arrangement the adder 9, comparator 10 and threshold voltage 14 need not be utilized. Thus, linear circuitry, digital circuitry, fuzzy logic circuitry or other electronic means, both with and without a comparator means, are contemplated for connection to a magnetoresistive array according to the present invention.

Figure 2B:
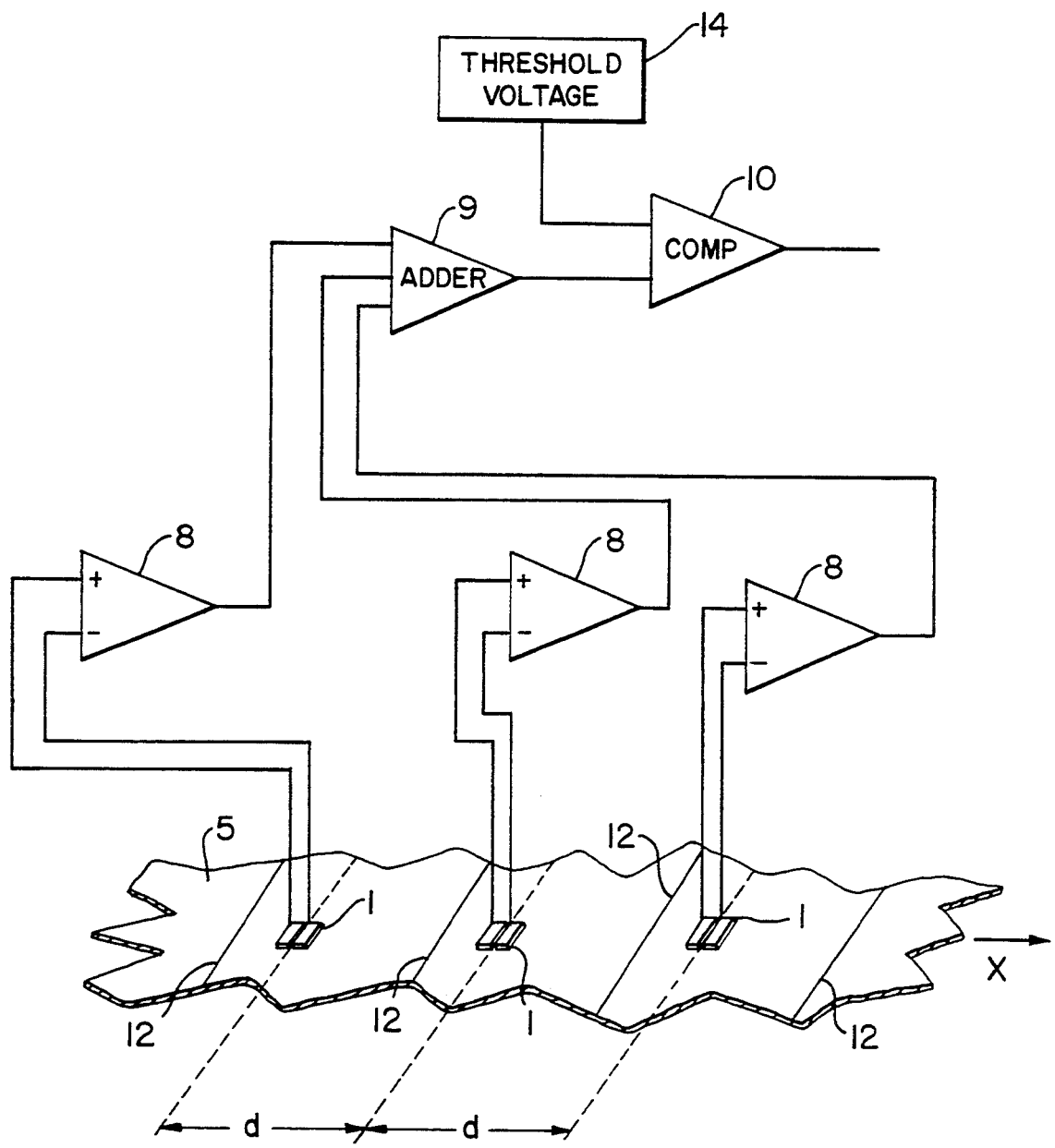
FIG. 2B is a simplified diagram of a three sensor array.

FIG. 2B depicts a three sensor array which can be used to detect a repetitive line separation or magnetic event, such as those events which occur on the portrait of a U.S. banknote. To detect one specific repetitive event having a separation "d", an array of three or more sensors can be used where each is separated from the other by a distance "d". Thus, FIG. 2B depicts three sensors, equally spaced apart from each other at the same distance "d", and each having their output connected to the adder 9. The threshold voltage 14 at the input of the comparator 10 must be increased to reflect the larger signal output from the adder 9 that will occur when all three sensors simultaneously detect the magnetic ink lines 12. Of course, other circuitry could be used with the sensors, as explained above, which would obviate the need for a threshold voltage.

An arrangement of three or more sensors in an array, such as the array of FIG. 2B, is advantageous because the adder output is higher by n, the number of elements in the array, when the desired separation between transitions is detected. Thus, resolution is improved in the face of random events or other magnetic events occurring repetitively at other separations. For example, assuming an output of unity from each sensors' voltage amplifier, for a two sensor array n is only 2 and the threshold level has to be greater than any single output, but yet less than the peak value of 2. However, an array of three or more sensors having the same separation has the advantage that amplifier gain errors can be larger and still permit detection of the desired signal. Additionally, the signal to noise performance is improved by increasing the number of sensors. Further, the resolution of the array, the ability to determine differences between two transition patterns, x1 and x2, improves as the number of array elements n increases since the adder output changes more rapidly with an increment movement of the medium (See FIG. 7 where this improvement is evident for an array where the number of sensors is shown for n=2, 3 and 4).

It is envisaged that more than two sensors may be used in an array configuration to detect a particular magnetic pattern. According to the embodiment of the invention depicted in FIG. 2A, if three differently spaced magnetic line patterns were to be identified, a total of six sensors would be required. However, if the reference sensor concept is used, which is discussed below with respect to FIGS. 4A and 4B, the total number of sensors required would be reduced to four.

Figure 4A:
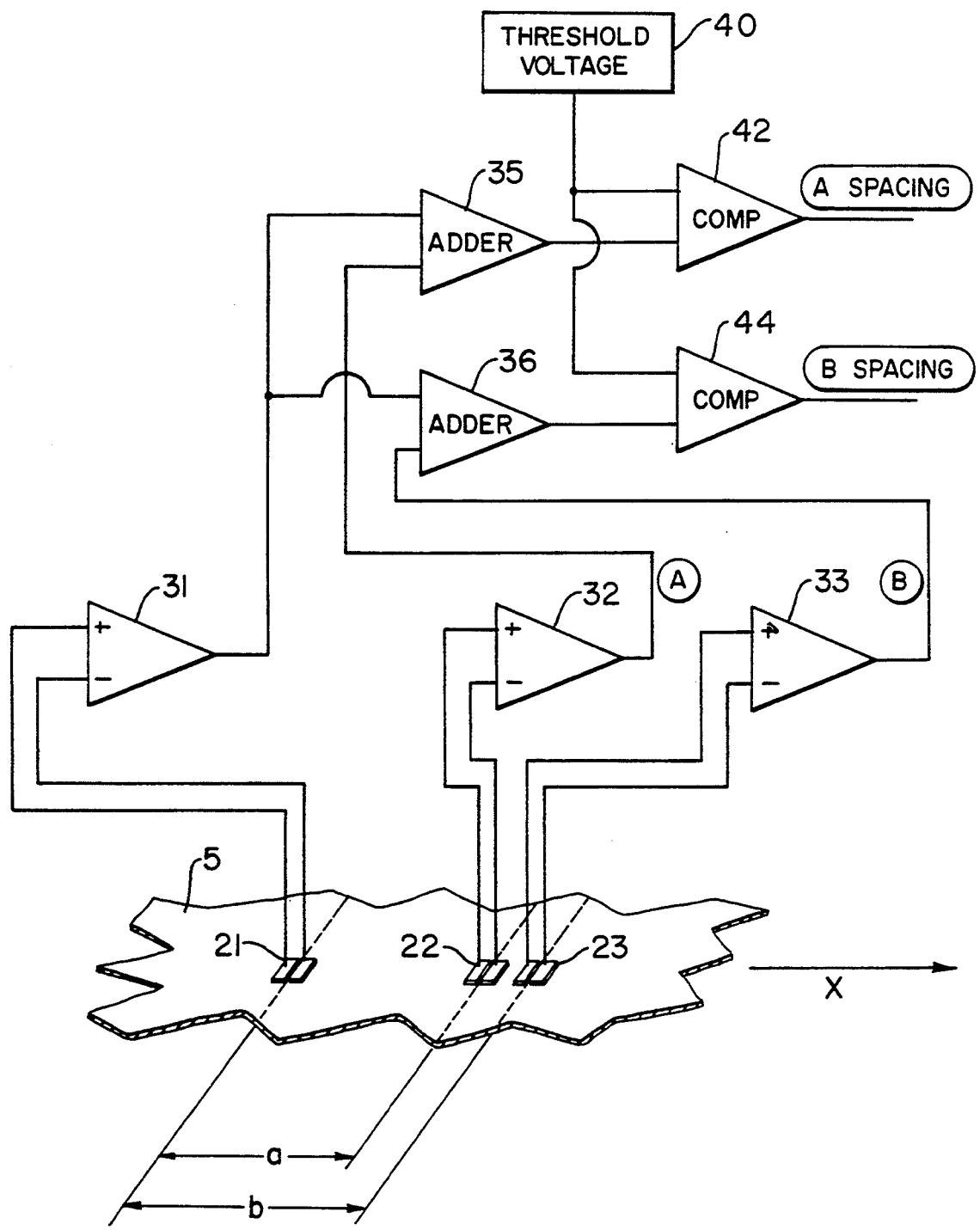
FIG. 4A depicts three horizontal magnetoresistive sensors arranged in another array configuration.

FIG. 4A is a simplified diagram of an embodiment of the present invention wherein a common reference sensor is used to minimize the number of magnetoresistive sensors needed to detect magnetic events of different separations. Although the differential voltage amplifiers 31, 32, 33 are depicted, the resistors and constant current supplies necessary for operation of each of the sensors are not shown. The array configuration of FIG. 4A has three sensors 21, 22 and 23 arranged in a single line, which are capable of identifying two different magnetic line patterns. Sensors 21 and 22 are electrically connected together via adder 35, and are spaced apart to identify a magnetic line separation of distance "a" on a media 5, such as a banknote, as the banknote 5 moves beneath the sensors in the direction of arrow X. Similarly, sensors 21 and 23 are electrically connected together via adder 36, and spaced apart to identify a magnetic line separation of distance "b". Thus, sensor 21 is used as a reference sensor, and in conjunction with sensor 22 may operate to identify one denomination banknote, and in conjunction with sensor 23 may operate to identify another denomination banknote. Alternately, a pattern that occurs at distances "a" and "b" simultaneously may be detected.

The gains of the differential voltage amplifiers 31, 32 and 33 are all normalized with respect to one another and set to a specific voltage. Assuming that the maximum output of each of the amplifiers 31, 32 and 33 is 1.0 V, magnetic line separations of distance "a" will cause the outputs of amplifiers 31 and 32 to simultaneously be 1.0 V each as the lines move beneath sensors 21 and 22. The outputs of amplifiers 31 and 32 are connected to the input of a voltage adder 35. Thus, the output of voltage adder 35 will be 2.0 Volts. As described above, a minimum threshold voltage 40 is predetermined for comparison to the outputs of the voltage adders. Assuming that the threshold voltage had been set at 1.5 V, then since the output of voltage adder 35 is 2.0 V, the banknote would be identified as a type having magnetic ink lines of spacing "a" by comparator 42. Similarly, banknotes having ink lines of a spacing "b" would cause the outputs of amplifiers 31 and 33 to simultaneously go to 1.0 V, and thus cause the output of voltage adder 36 to be 2.0 Volts. Thus, the banknote would be identified as a type having magnetic ink lines of spacing "b" by comparator 44. Of course, as a banknote moves beneath the sensors 21, 22 and 23, at various times a magnetic ink line may be sensed by only one of the sensors. When this occurs, there is no effect since only 1.0 V will appear at the output of either adder 35 or 36 which will be ignored since it is less than the predetermined minimum threshold of 1.5 V.

Where the magnetic transitions are separated by a distance not equal to "a" or "b", these magnetic transitions will cause the output of sensors 21, 22 and 23 to go on in sequence one after another as the banknote is moved beneath the sensors. However, since the reference sensor 21 output and another sensor output will not be on simultaneously absent a spacing equal to "a" or "b", the output of the adder 35 or 36 will not exceed 1.0 V at any time. Thus, the banknote will not be identified as being of one type or another since the threshold voltage of 1.5 V was not exceeded.

Figure 4B:
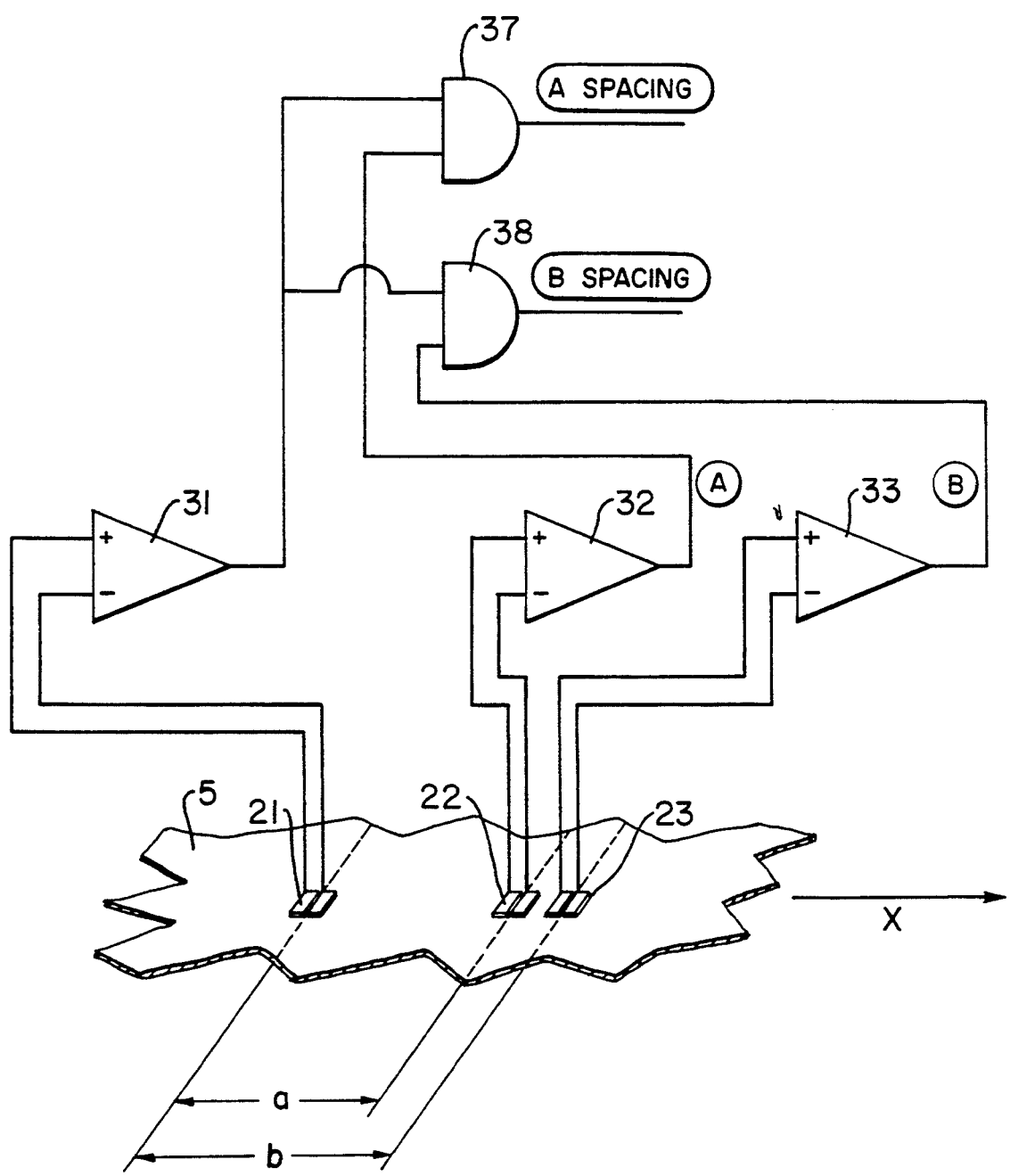
FIG. 4B depicts the array configuration of FIG. 4A connected to digital circuitry.

FIG. 4B is a simplified diagram of the array embodiment of FIG. 4A connected to digital circuitry. The three magnetoresistive sensors 21, 22 and 23 are arranged in a single line and the array can identify two different magnetic line patterns. Sensors 21 and 22 are connected together via AND gate 37, and are spaced apart to identify a magnetic line separation "a" as a banknote 5 moves beneath the sensors in the direction of the arrow X. Similarly, sensors 21 and 23 are connected together via AND gate 38, and are spaced apart to identify a magnetic line separation of distance "b". Thus, as in FIG. 4A, sensor 21 is used as a reference sensor. In order for a banknote to be identified as being of a type having magnetic transitions at distance "a", the outputs of the differential voltage amplifiers 31 and 32 must be high simultaneously for the AND gate 37 to generate an output. Similarly, for a banknote to be identified as being of a type having magnetic transitions at a distance "b", the outputs of voltage amplifiers 31 and 33 must be high simultaneously for the AND gate 38 to generate an output. Thus, the adder, comparator and threshold voltage components used in the circuit arrangement described in FIG. 4A are not required. The outputs of the AND gates 37,38 could be connected to a microprocessor or other control circuitry. One skilled in the art will understand that other circuitry could be connected to an array according to the present invention, to determine the time coincidence of magnetic transitions, such as linear, digital, or fuzzy logic circuitry or other electronic means.

If the apparatus of FIGS. 4A and 4B were configured to identify one-dollar and five-dollar U.S. banknotes, the distances "a" and "b" would equal 200 and 275 microns, respectively. These distances correspond to the respective separations of the vertical component of the magnetic grid lines on the portrait-face of U.S. one-dollar and five-dollar banknotes. According to these embodiments, with two sensors per line separation to detect N different magnetic line patterns requires an array of N+1 sensors. For example, to identify and distinguish between the magnetic inkline patterns found on one-dollar, two-dollar, and five-dollar U.S. banknotes, only four sensor elements would be needed. The number of sensors illustrated in FIGS. 4A and 4B were selected for ease of explanation and do not represent a limitation on the number of sensors that could be utilized either to detect more magnetic line separations or to detect a given line separation or pattern of separations.

It would be readily apparent to one skilled in the art that the minimum number of sensors in an array could be further reduced if any two non-reference sensors are coincidentally separated by a spacing equal to that of magnetic transitions which are to be detected. In such a situation, merely electrically connecting together these two sensors in one of the ways described above would obviate the need to add any additional sensors, thereby reducing the minimum number of sensors required to detect N different patterns.

According to another embodiment of the present invention, to identify the denomination of one-dollar, two-dollar and five-dollar U.S. banknotes, three separate array circuits like that shown in FIG. 2 are utilized. The first array comprises two or more sensors whose gaps are spaced 200 microns apart to match the magnetic ink grid line separation of a one-dollar bill. The second array consists of two or more sensors whose gaps are separated by a distance of 250 microns to match the magnetic ink grid line separation of a two-dollar bill. Lastly, the third array consists of two or more sensors whose gaps are separated by a distance of 275 microns to match the magnetic ink line separation of a five-dollar bill. The present invention thus contemplates using more than two magnetoresistive sensors to sense a particular magnetic transition pattern. For example, three or more equally spaced sensors could be used to denominate a one dollar U.S. banknote.

When a one-dollar bill is inserted into a validator apparatus, the magnetic ink line spacing matches that of the first array causing the associated comparator output to indicate a peak condition. The comparator outputs for the two-dollar and five-dollar detection arrays remain low because of the minimal signal present at the output of their respective voltage adders due to the mismatch of the magnetic line spacing to the sensor spacing for those arrays. In addition, specific patterns, such as simultaneously occurring magnetic events at two or more separation distances, could be detected. Further, more arrays can be added to validate other bills.

To insure the accurate operation of an array, the signal generated from each sensor should decrease rapidly as the magnetic transition is moved away from the center of the gap 6. Otherwise, a potentially large signal and a false match indication could be produced from an array when the magnetic event spacing and the array sensor separation are slightly mismatched.

An unshielded horizontal magnetoresistive head, with each magnetoresistive element having a width of 32 microns and a gap of 6 microns, was tested for spatial resolution by moving the head past a square wave signal recorded on magnetic recording tape. Test results show that a spatial resolution of 23 microns is sufficient to distinguish between the spatial differences of one-dollar, two-dollar and five-dollar bills. As a result, if these horizontal magnetoresistive sensors are to be used to denominate U.S. banknotes, typical widths for each magnetoresistive element 2 are in the range of 20 to 32 microns, with the gaps 6 having a width ranging from 2 to 16 microns. These measurements may vary depending on the media being sensed.

Figure 5:
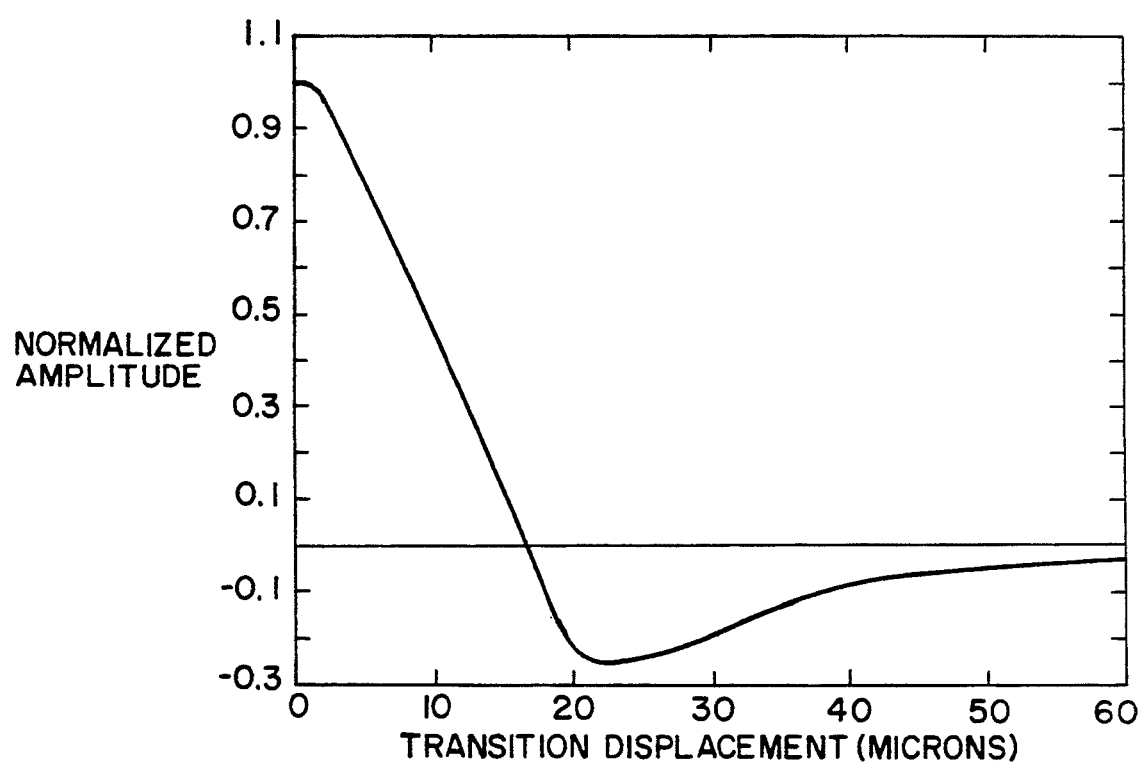
FIG. 5 is a graphical representation of the output signal of a single unshielded horizontal magnetoresistive sensor as a single magnetic transition moves past the sensor.

FIG. 5 is a graphical depiction of the normalized output signal response of a magnetoresistive head to a single isolated sharp transition, as a function of the displacement of the transition from the center of the gap in a computer simulation with a spatial resolution of 19 microns (two times the distance from maximum signal generation to a position of one-half maximum signal generation).

Figure 6A:
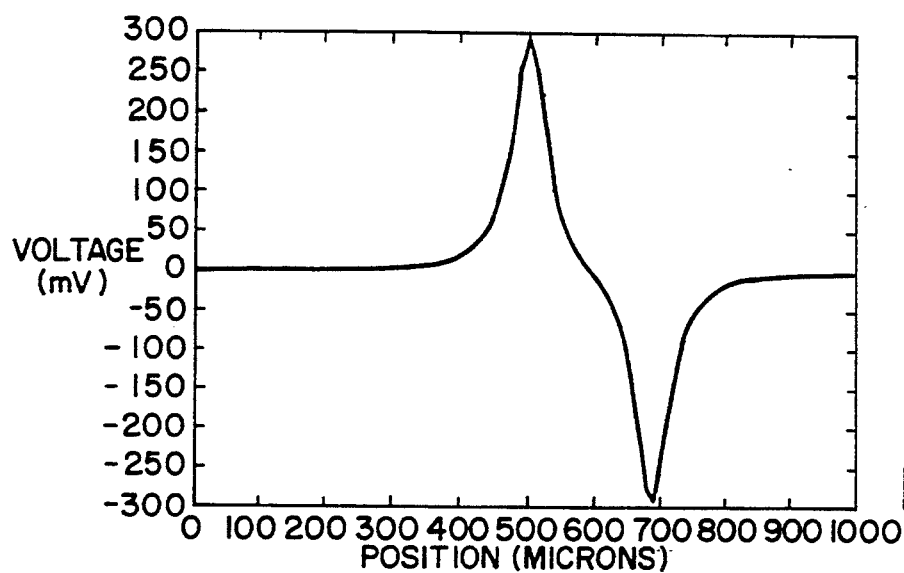
FIG. 6(a) graphically represents the output signal from a three magnetoresistive sensor array configuration where the sensors are equally spaced from one another, and where the magnetic data on a medium aligns with the sensors.
Figure 6B:
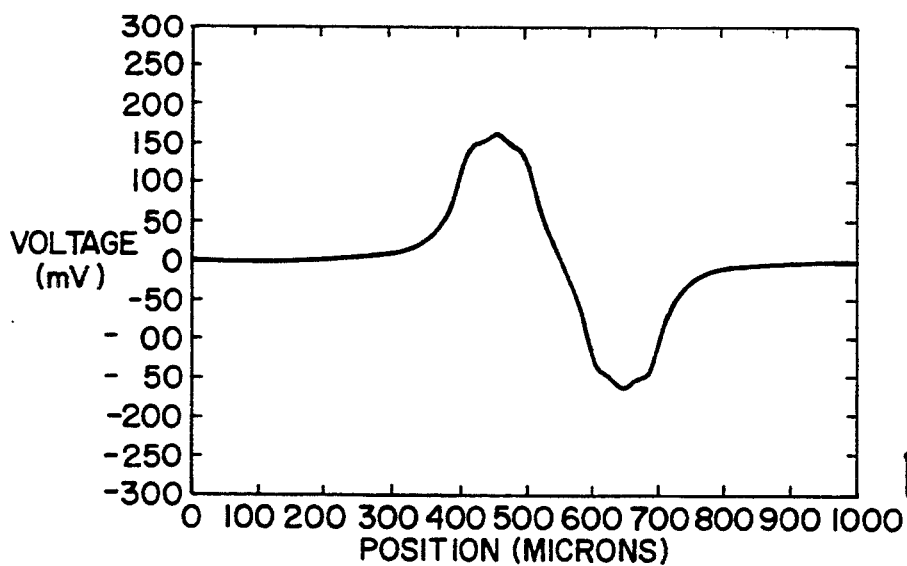
FIG. 6(b) is the same graphical representation as in FIG. 6(a) except that the magnetic data on the medium is misaligned by 40 microns.
Figure 6C:
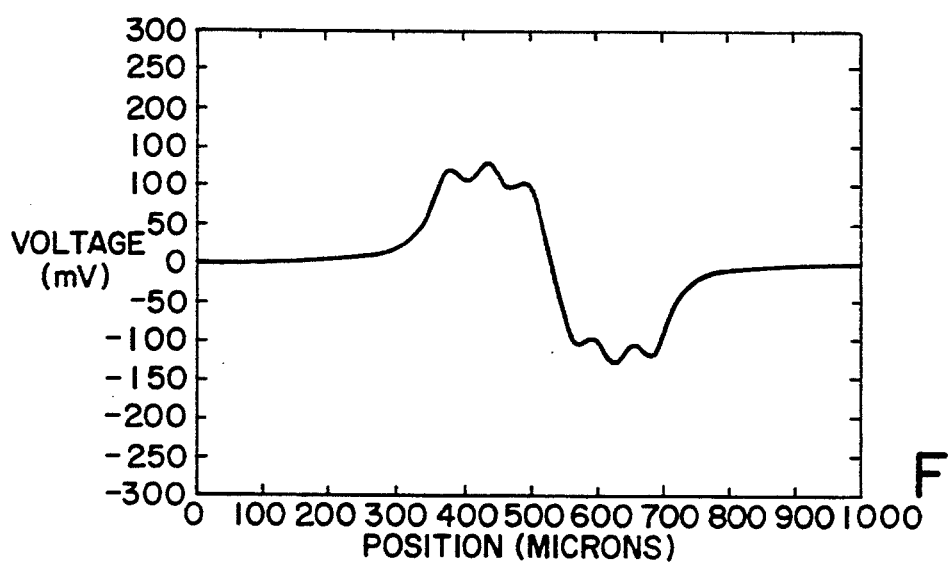
FIG. 6(c) is the same graphical representation as in FIG. 6(a) except that the magnetic data on the medium is misaligned by 60 microns.

FIGS. 6(a)-(c) illustrate the effect on the output signal of an array comprised of three sensors of equal separation when a spacing match and varying mismatches occur. More particularly, FIG. 6(a) illustrates that when a match occurs the magnitude of the array signal output rises sharply to 300 mV before falling off sharply. FIG. 6(b) illustrates the output signal for the same array when a mismatch of 40 microns occurs, which produces flattened peaks with a maximum magnitude of approximately 170 mV. FIG. 6(c) illustrates the output signal when a mismatch of 60 microns occurs, which produces a further degraded signal of approximately 140 mV.

Thus, if a three sensor array were set up to denominate one dollar U.S. banknotes, a threshold of 235mV might be set, in which case a sensed banknote that produces the output shown in FIG. 6(a) would qualify as being a one dollar denomination. However, if the threshold were set to 150mV, any sensed banknote which produces the output shown in FIG. 6(b) or FIG. 6(a) would qualify. In this manner, the sensitivity of the array can be set to a desired level of resolution. Note that variability of the sensors, error in gain from the amplifiers, media errors, noise and other considerations are taken into account in setting this level.

Figure 7:
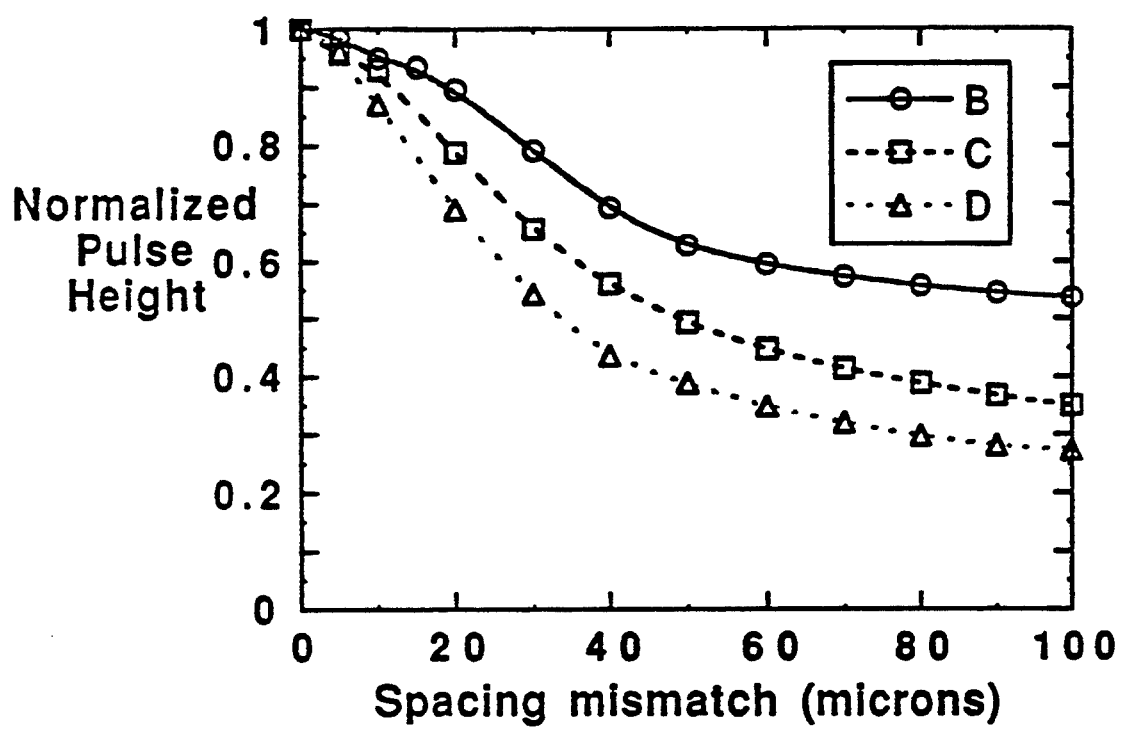
FIG. 7 graphically represents the improvement in spatial resolution that occurs as the number of equally spaced magnetoresistive sensors of an array is increased.

FIG. 7 graphically depicts the improvement in resolution that occurs when a greater number of sensors are used to detect a particular magnetic transition pattern. In FIG. 7, normalized pulse height is plotted against the spacing mismatch in microns for different numbers of equally spaced sensors in an array apparatus. The trace marked B represents an array having two sensors, while the traces marked C and D represent arrays with three and four sensors, respectively. FIG. 7 demonstrates, as expected, that the greater the number of sensors used to detect a particular separation of magnetic transitions, the more rapidly the summed output signal falls off with increasing mismatch displacements. Thus, the greater the number of sensors utilized in such an array, the better the spatial resolution.

When two arrays are used to identify two separate spatial separations of magnetic events on the medium, then the number of elements can be reduced by one, if the arrays can be aligned, and if one sensor is shared as a reference. This array technique can be used to identify one specific pattern which may or may not recur on the medium. The presence of a specific pattern can be determined by adding a counter, either explicitly as an integrated circuit, or implicitly such as might be implemented by a microprocessor and the appropriate software. In either case, the number of events that have been detected within a given region of the media under test is determined. Further, more than one pattern or separation can be determined by use of more than one array. Photolithographic techniques permit the compact and low cost fabrication of such arrays, and allow the necessary spatial placement of the individual sensor elements in the array or arrays to be easily defined and controlled.

As explained thus far, the sensor array has been described as having equal spacing between sensors to detect a magnetic pattern with equal separation between magnetic events. However, the present invention can be customized to detect other patterns, both periodic and non-periodic, as well. For example, to detect a pattern on a medium consisting of alternating magnetic line spacings of 250 and 275 microns, an array of sensors alternating at 250 and 275 microns could be constructed. Other complete patterns that might not have a repeating spacing could be detected as well by fabricating an array of sensors that reflect this more complex spacing.

For the purpose of the above discussion, it was assumed that only a positive voltage was generated as a magnetic transition passes beneath the magnetic heads. In an apparatus according to the present invention, any negative signal may be ignored, clipped, clamped or rectified as is appropriate for the application. Further, it should be obvious to one skilled in the art that the negative signal may be used as the active portion of the signal while ignoring any generated positive signals.

In the embodiments described above the detection of the presence of specific magnetic patterns are performed directly with signals appearing in real time without the need for post processing. In addition, it would be readily apparent to one skilled in the art to expand the disclosed technique to detect patterns of a more complex nature. For example, magnetic patterns which do not necessarily occur with equal spacings, such as those appearing on a magnetic strip of a credit card, could be read.

The above descriptions are merely illustrative and are not to be construed as limitations thereof. Thus, the present invention covers all modifications, changes and alternatives in its design, construction and method of use which fall within the scope of the principles taught herein.

We claim:

1. An apparatus for identifying a magnetic medium, comprising:
  an array having a first horizontal magnetoresistive sensor spaced a predetermined distance apart from a second horizontal magnetoresistive sensor, wherein the predetermined distance is set to equal the separation of magnetic transition data which is characteristic of the medium type to be identified;
  a summing means connected to the first and second magnetoresistive sensors for adding together the outputs of the sensors, wherein the output of the summing circuit is at a maximum value when both sensors simultaneously sense magnetic transition data; and
  a comparator means connected to the output of the summing means, for comparing the summing means output to a predetermined minimum threshold value, wherein the medium is identified as being of a certain type if the summing means output is greater than the threshold value.

2. The apparatus of claim 1, further comprising:
  means for normalizing the output generated from each sensor with respect to one another.

3. The apparatus of claim 1, wherein the horizontal magnetoresistive sensors are unshielded.

4. The apparatus of claim 1, wherein the array comprises:
  three or more magnetoresistive sensors spaced the same predetermined distance apart from one another, wherein the output of each of the sensors is connected to the summing circuit.

5. The apparatus of claim 1, wherein the threshold value is derived from one or more signals in the apparatus.

6. The apparatus of claim 5, wherein the threshold value is adjusted at the time of manufacture of the apparatus.

7. The apparatus of claim 1, wherein a plurality of arrays are used to identify a magnetic medium, and wherein the magnetoresistive sensors of a first array are spaced apart to identify one type of magnetic data pattern, and the magnetoresistive sensors of subsequent arrays are spaced apart to identify other types of magnetic data patterns.

8. The apparatus of claim 7, wherein a reference sensor comprises one of the sensors of each array.

9. An apparatus for identifying a magnetic pattern on a medium, comprising:
  an array having a first horizontal magnetoresistive sensor spaced a predetermined distance apart from a second horizontal magnetoresistive sensor in a longitudinal direction, wherein the predetermined distance between the sensors is set to equal the separation of magnetic transition data which is characteristic of the magnetic pattern to be identified; and
  a logic means connected to the outputs of the first and second magnetic sensors for generating an output signal, wherein the logic means generates an output when both magnetoresistive sensors simultaneously sense magnetic transition data.

10. The apparatus of claim 9, wherein the horizontal magnetoresistive sensors are unshielded.

11. The apparatus of claim 9, wherein the logic means is an AND gate.

12. The apparatus of claim 9, wherein the logic means comprises a digital circuit.

13. The apparatus of claim 9, wherein the array comprises three or more magnetoresistive sensors spaced the same predetermined distance apart from one another, and wherein the output of each of the sensors is connected to the logic means.

14. The apparatus of claim 9, wherein a plurality of arrays are used to identify a magnetic medium, wherein the sensors of a first array are spaced apart to identify one type of magnetic data pattern, and the magnetoresistive sensors of subsequent arrays are spaced apart to identify other types of magnetic data patterns.

15. The apparatus of claim 14, wherein a reference sensor comprises one of the sensors of each array.

16. An apparatus for detecting magnetic patterns for use in a currency validator, comprising:
  a plurality of horizontal magnetoresistive sensors arranged to form arrays, each array containing at least two sensors, wherein each array is characterized by a preset distance separating the sensors;
  a plurality of summing means for summing the output of each array; and
  a plurality of a threshold detectors connected to the plurality of summing means, wherein each threshold detector corresponds to a denomination type and wherein a particular threshold detector generates an output when characteristic magnetic data corresponding to that particular denomination type is sensed.

17. The apparatus of claim 16, wherein a reference sensor comprises one of the sensors of each array.

18. An apparatus for detecting magnetic patterns for use in a currency validator, comprising:
  a plurality of horizontal magnetoresistive sensors arranged to form arrays, each array containing at least two sensors, wherein each array is characterized by a preset distance separating the sensors; and
  a plurality of logic means, wherein each logic means is connected to an array, and wherein each logic means corresponds to a denomination type and generates an output when characteristic magnetic data corresponding to that particular denomination type is sensed.

19. The apparatus of claim 18, wherein a reference sensor comprises one of the sensors of each array.

20. The apparatus of claim 18, wherein a plurality of horizontal magnetoresistive sensors are spaced the same predetermined distance apart from one another to form the array, and wherein the outputs of each of the plurality of sensors is connected to the logic means.

21. The apparatus of claim 18, wherein a plurality of horizontal magnetoresistive sensors are spaced at a periodic or non-periodic, repeating or non-repeating predetermined distance apart from each other to form the array, wherein the array detects a portion or an entire magnetic pattern or medium, and wherein the outputs of each of the plurality of sensors is connected to the logic means.

22. An apparatus for denominating banknotes containing magnetic transition data, comprising:
a first horizontal magnetoresistive sensor spaced a predetermined distance apart from a second magnetoresistive sensor to form an array, wherein the predetermined distance corresponds to the separation of the magnetic transition data on a banknote type to be denominated;
a summing circuit connected to the outputs of the first and second horizontal magnetoresistive sensors, wherein the output of the summing circuit is at a maximum voltage when magnetic transition data is sensed simultaneously by both the first and second sensors; and
a comparator circuit connected to the output of the summing circuit and to a predetermined threshold voltage, wherein the output of the comparator circuit indicates that a banknote of a certain type was tested if the output voltage of the summing circuit is greater than the predetermined threshold voltage.

23. The apparatus of claim 22, wherein a plurality of horizontal magnetoresistive sensors are spaced the same predetermined distance apart from one another to form the array, and wherein the outputs of each of the plurality of sensors is connected to the summing circuit.

24. The apparatus of claim 22, wherein a plurality of horizontal magnetoresistive sensors are spaced at a periodic or non-periodic, repeating or non-repeating predetermined distance apart from each other to form the array, wherein the array detects a portion or an entire magnetic pattern or medium, and wherein the outputs of each of the plurality of sensors is connected to the summing circuit.

25. A method for identifying a magnetic medium by detecting magnetic data on the medium comprising the steps of:
arranging horizontal magnetoresistive sensors, connected in groups of at least two sensors, to be spaced apart a predetermined distance from one another;
transporting the magnetic medium past the sensors;
sensing magnetic transitions on the medium;
generating a signal for each sensed magnetic transition;
summing the generated signals as they occur for each group of sensors; and
comparing the summed signals to at least one predetermined threshold value to determine if a pattern of interest indicative of medium type has been detected.

26. The method of claim 25, further comprising:
normalizing each generated signal for the sensed magnetic transitions.

27. The method of claim 25, wherein the predetermined threshold value is set to be between the maximum summed value when a magnetic transition is sensed at each sensing position, and the summed value when a magnetic transition is sensed at each sensing position less a constant.

28. The method of claim 25, further comprising:
generating an output if the summed signal is at approximately that maximum value produced by an ideal signal under a predetermined number of the sensing elements of the array to indicate that the pattern of interest has been detected.

29. A method for identifying a magnetic medium by detecting magnetic data on the medium, comprising the steps of:
arranging at least one array of horizontal magnetoresistive sensors, wherein each array comprises at least two sensors spaced apart in a longitudinal direction to be a predetermined distance from one another;
connecting a logic circuit to each array;
transporting the medium past the sensors;
sensing magnetic transitions on the medium;
generating a signal for each sensed magnetic transition;
processing the generated signals as they occur for each group of sensors; and
identifying the magnetic medium as being of a particular type if at least one logic circuit indicates that a pattern of interest was sensed.

30. The method of claim 29, further comprising:
identifying the magnetic medium as being of a particular type if at least two logic circuits generated outputs at predetermined times.

31. The method of claim 29, wherein the magnetoresistive sensors are arranged in a single line, and wherein one sensor is utilized as a common reference sensor in each array.

32. The method of claim 29, wherein the magnetic pattern of interest consists of non-equally spaced magnetic transitions, which may be periodic, and wherein said pattern is detected by an array of sensors that reflect the same spacial relation as the pattern to be detected.

33. The method of claim 32, wherein an output signal is generated identifying the medium as being of a particular type only if a predetermined number of the sensors of said array generated an output signal.

34. The method of claim 29, wherein the sensing system consists of more than one array of sensors for detecting magnetic signals of a particular spacing.

35. A method of identifying magnetic media having parallel equally spaced magnetic transitions using arrays of horizontal magnetoresistive sensors, comprising the steps of:
arranging the magnetoresistive sensors to form arrays, each array containing at least a pair of sensors, wherein each array is characterized by the sensors being separated by predetermined distance which corresponds to the separation of magnetic data of interest;
transporting a medium containing patterns with magnetic components past the sensor arrays;
sensing the magnetic data;
generating a normalized signal for each magnetic transition sensed at each of the array sensing positions;
summing the generated signals within each array;
detecting whether any of the summed signals is close to the approximate value produced by the presence of the desired magnetic pattern beneath each of the sensors of the array; and
generating an output signal identifying the medium as being of particular type if any one summed signal is at an approximately maximum value.

36. The method of claim 35, wherein the step of detecting whether any of the summed signals is at an approximately maximum value comprises:
   comparing the summed signal to a predetermined threshold value.

37. The method of claim 36, wherein the predetermined threshold value is set to be between a maximum summed signal that occurs when magnetic transitions are sensed at all the array sensing positions, and a predetermined value equal to that of a summed signal that would occur if magnetic transitions were sensed at less than all of the array sensing positions.

38. The method of claim 35, wherein the horizontal magnetoresistive sensors are arranged in a single line, and wherein one sensor is utilized as a common reference sensor in each array.

39. The method of claim 35, wherein a pattern of interest consists of non-equally spaced magnetic transitions, which may be periodic, and wherein said pattern is detected by an array of sensors that reflect the same spacial relation as the pattern to be detected.

40. The method of claim 39, wherein an output signal is generated identifying the medium as being of a particular type only if the summed signal of a predetermined number of the sensors of said array are at an approximately maximum value.

41. The method of claim 35, wherein the sensing system consists of more than one array of sensors for detecting magnetic signals with a particular spacing, wherein the magnetic signals may be periodic in nature.

* * * * *